(12) United States Patent
Majid et al.

(10) Patent No.: US 7,978,946 B2
(45) Date of Patent: Jul. 12, 2011

(54) OPTICAL FIBERS WITH IMPROVED RESISTANCE TO INGRESSING MOLECULES

(75) Inventors: Imtiaz Majid, Shrewsbury, MA (US);
Abdel Soufiane, Boston, MA (US);
Kanxian Wei, Shrewsbury, MA (US);
Gary Drenzek, Westfield, MA (US);
Chih-Hao Wang, Ashland, MA (US)

(73) Assignee: Verrillon, Inc., North Grafton, MA (US)

( * ) Notice: Subject to any disclaimer, the term of this patent is extended or adjusted under 35 U.S.C. 154(b) by 1622 days.

(21) Appl. No.: 10/893,123

(22) Filed: Jul. 16, 2004

(65) Prior Publication Data

US 2005/0031867 A1    Feb. 10, 2005

Related U.S. Application Data

(60) Provisional application No. 60/488,054, filed on Jul. 17, 2003.

(51) Int. Cl.
*G02B 6/036* (2006.01)
*G02B 6/02* (2006.01)

(52) U.S. Cl. ........ 385/125; 385/123; 385/126; 385/127; 385/128; 385/144; 428/368; 428/375; 428/392; 428/398

(58) Field of Classification Search ................ None
See application file for complete search history.

(56) References Cited

U.S. PATENT DOCUMENTS

| 4,715,678 A | 12/1987 | Johnson et al. |
| 6,418,258 B1 | 7/2002 | Wang |
| 2003/0056550 A1 | 3/2003 | Tanaka et al. |
| 2004/0247271 A1* | 12/2004 | Skovgaard et al. ........... 385/125 |

FOREIGN PATENT DOCUMENTS

EP   0585 088 A2   3/2004

OTHER PUBLICATIONS

Pickrell et al., *Novel Techniques for the Fabrication of Holey Optical Fibers*, Proc. SPIE vol. 4578, 2002, p. 271-282.

* cited by examiner

*Primary Examiner* — Jill Gray
(74) *Attorney, Agent, or Firm* — Goodwin Procter LLP

(57) ABSTRACT

An optical fiber includes a glass fiber having a glass core and a cladding which contains voids spaced apart from the core. The voids act as trapping sites for ingressing molecules from the surrounding environment, thereby reducing the effect of such molecules on the fiber's light-transmission properties.

12 Claims, 3 Drawing Sheets

OPTICAL FIBERS WITH IMPROVED RESISTANCE TO INGRESSING MOLECULES

RELATED APPLICATIONS

This application claims the benefit of and priority to U.S. Patent Application No. 60/488,054, filed Jul. 17, 2003, the enclosure of which is incorporated by reference herein.

FIELD OF THE INVENTION

This invention relates in general to optical fibers and specifically to optical fiber designs that provide increased resistance (with respect to optical performance) to ingressing molecules.

BACKGROUND

Optical fibers are finding increased applications in environments that are relatively harsh compared to traditional telecommunications operating conditions. For example, in geophysical and geothermal applications (e.g., oil well exploration), optical fibers are deployed in very diverse roles ranging from data logging (requiring high bandwidth fiber) to acting as distributed temperature and pressure sensing elements. The conditions that the optical fiber experiences in such applications can reach temperatures as high as several hundred degrees Centigrade and pressures of several hundred atmospheres in fluid (i.e., gaseous or liquid) environments that contain water, hydrogen, hydrocarbons, sulfides, etc. It is well known that traditional glass optical fibers are very susceptible to both hydrogen and moisture ingress, and therefore the use of optical fibers in such environments generally requires protection from ingressing substances in order to ensure proper function over extended periods of time.

The traditional approach to protecting optical fibers from harsh environments has been the application of an impervious coating on the surface of the glass. Many different coatings have been tried, including metals (see, e.g., Wysocki, "Reduction in Static fatigue of Silica Fibers by Hermetic Jacketing," *Applied Physics Letters* 34(1) (January 1979)), ceramics (see, e.g., U.S. Pat. Nos. 4,028,080 and 4,512,629) and carbon (see, e.g., U.S. Pat. No. 4,183,621 and Huff et al., "Amorphous Carbon Hermetically Coated Optical Fibers," Technical Digest for *Optical Fiber Communication Conference*, Paper TUG-2 (1988)). Metals tend to form polycrystalline structures in which the grain boundaries act as short-circuit diffusion paths and can themselves become rapidly corroded in harsh environments; additionally, even soft metals such as tin and aluminum tend to induce losses due to micro-bending.

Ceramic coatings, such as silicon nitride or silicon carbide, have been demonstrated to be effective in providing resistance to water at elevated temperatures and pressures (as evidenced by high stress-corrosion parameter values). For these coatings, however, the mean strength generally falls significantly below the value for standard polymer-coated glass fibers, and as is the case with metals, the high moduli of the coating materials tend to give rise to significant micro-bending losses. Hence, neither ceramic nor metal coatings are ideal in terms of combining strength, hermeticity and resistance to bend loss in the same fiber.

Carbon coatings can provide these properties, however, at least at relatively low temperatures (about 100° C. or below). For example, at such temperatures saturation lifetimes with respect to hydrogen ingress are on the order of years; micro-bending is minimal (for relatively small coating thicknesses) and mean strength, while on average probably still below the optimal values obtained for polymer-coated fibers, can be improved with process/roughness control during the deposition of the carbon. At temperatures above about 150° C., hermeticity with respect to hydrogen ingression starts to degrade, and the strong exponential dependence of the diffusion coefficient of $H_2$ through the carbon coating makes it more permeable to $H_2$ at temperatures greater than about 100° C., with saturation being achieved in a matter of days. Carbon-coated optical fibers have been manufactured for some time (see Huff et al., supra), and the permeability of these coatings with respect to hydrogen diffusion has been extensively studied (see, e.g., LeMaire et al., "Hydrogen permeation in optical fibers with hermetic carbon coatings," *Electron Lett.* 24:1323-1324 (1988)). The time dependence of the change in attenuation (e.g., at 1.24 μm) due to hydrogen in the glass fiber is given by:

$$\Delta\alpha_{1.24}(t,T)/\{\Delta\alpha_{1.24}(inf,T) \times P_{H2}\} = [1-\exp\{-(t-\tau_i)/\tau_f\}] \quad (1)$$

where $\Delta\alpha_{1.24}(t,T)$ is the change in attenuation (at 1.24 μm) after the fiber has been exposed to a hydrogen environment for time t at temperature T; $\Delta\alpha_{1.24}(inf,T)$ is the change in attenuation when equilibrium has been reached between the fiber and the environment; and $P_{H2}$ is the hydrogen pressure. $\tau_i$ and $\tau_f$ are, respectively, the time constants for initial lag (before any increase in attenuation is observed) and the rate at which the attenuation increases at any given temperature T. Also, for relatively thin coatings, $\tau_i$ is generally much less than $\tau_f$. For relatively short times, then, equation (1) becomes $$\Delta\alpha_{1.24}(t,T)/\{\Delta\alpha_{1.24}(inf,T) \times P_{H2}\} \approx [t/\tau_f] \quad (2)$$

A plot of the left side of equation (2) vs. time "t" should yield a line with slope $1/\tau_f$. $\tau_f$ and $\tau_i$ describe the permeation characteristics of the carbon coating. Larger values of $\tau_f$ imply a increasingly resistant coatings, and maximizing its magnitude has been the object of much research. Most studies to date that have tried to optimize the value of $\tau_f$ have focused on the carbon deposition conditions, precursor gases, and the like (see, e.g., U.S. Pat. No. 5,000,541 and Aikawa et al., *IWCS Proceedings* at 374 (1993)).

SUMMARY OF THE INVENTION

As discussed above, previous work relating to improving the performance of optical fibers in harsh environments has generally focused on modifying or optimizing the properties of the coating on the glass fiber surface. Researchers have met this goal with varying levels of success. For example, practical conditions in which suitable fibers can be employed may be restricted to temperatures below about 150° C., and even then, depending on the environment, the fibers may be able to withstand exposure only for relatively short periods of time. The present invention addresses the problem of in-diffusing molecules in an optical fiber immersed in a harsh environment by modifying and optimizing the design of the glass component of the fiber itself, independently of the properties (or even the presence) of the hermetic coating. In particular, the invention incorporates novel features in the structure of the glass fiber such that $\tau_f$ in equation (2) is increased by as much as one or two orders of magnitude. The ensuing description utilizes hydrogen as an illustrative example of an ingressing species due to its small molecular size, which renders it a particularly troublesome diffusant, and its well-known undesirable effects on light transmission through a fiber. It should be understood, however, that the invention is useful in mitigating the effects of virtually any ingressing species.

A fiber in accordance with the invention includes voids or gas trap lines (GTLs) that serve as sinks for ingressing molecules and can absorb a much higher concentration of ingressing molecules (in equilibrium) than the glass itself. If desired, the voids may contain reactive gases that combine with the in-diffusing species to form larger molecules that have much lower solubility and diffusivity in the glass. These molecules will therefore be present in the glass (core and cladding) at much lower concentrations. As a consequence of this design, the effect of the ingressing molecules (which have permeated into the glass fiber) on the fiber's light-transmission properties will be significantly reduced.

Accordingly, in a first aspect, the invention provides an optical fiber with improved resistance to ingressing molecules, such as hydrogen molecules, having a core for guiding at least a significant portion of incoming light and a cladding surrounding the core. The cladding contains one or more voids that are spaced apart from the core so as not to interfere with light traveling within the cladding and act as trapping sites for the ingressing molecules.

The voids can extend longitudinally through the fiber. The voids can form a pattern of concentric rings to create a multidirectional barrier to ingressing molecules; alternatively, the voids may be disposed in a random pattern. In some embodiments, the voids contain at least one gas capable of reacting with the ingressing molecules. Examples of suitable gases include, but are not limited to, a halogen gas (e.g., chlorine, bromine, or iodine), oxygen, and nitrogen. In some embodiments, the optical fiber is covered with a hermetic coating such as, for example, at least one of a ceramic material, metal, or a carbon-based composition.

In one embodiment, the closest distance between the voids and the center of the core divided by the radius of the core is greater than 1. In some embodiments, at the closest distance between the voids and the center of the fiber, the power of transmitted light is no more than $1/e^2$ of its maximum value.

In another aspect, the invention provides methods for making an optical fiber according to the invention. In some embodiments, the voids are formed by drilling or by placing one or more tubes in a preform. In other embodiments, the voids are formed by creating one or more bubbles in the cladding, such as, for example, by adding a gas-producing material to a preform prior to a fiber draw process. One or more reactive gases can be added to the voids during the fiber draw process or in a post-draw process. Alternatively, the reactive gases may be added to the voids by adding a gas-producing material to a preform prior to a fiber draw process.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
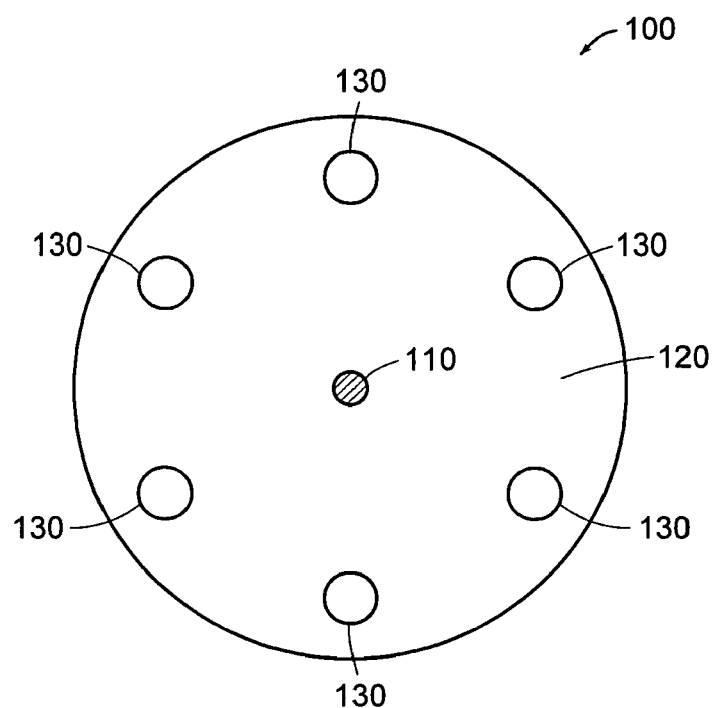
FIG. 1 is a cross-sectional view of an optical fiber according to an embodiment of the invention.

As shown in the sectional view of FIG. 1, an optical fiber 100 with improved resistance to ingressing molecules comprises a core 110 in which at least a significant portion of the light is guided. The core 110 is surrounded by a cladding 120 that contains a plurality of voids 130 that act as trapping sites for ingressing molecules. The voids 130 may, for example, take the form of parallel longitudinal bores that concentrically surround the core 110. Alternatively, the voids 130 may be of arbitrary or varying shapes, and may be located at organized or random locations within the cladding. For example, the cladding can include discrete voids (e.g., bubbles) dispersed throughout the cladding.

Fibers in accordance with the principles of the present invention can be manufactured from preforms, which can themselves be fabricated using techniques well known in the art, such as modified chemical vapor deposition (MCVD), chemical vapor deposition (CVD), plasma vapor deposition (PVD), or outside vapor deposition (OVD), although many other well-characterized techniques can also be used. A fiber preform is generally constructed using one of the aforementioned techniques, and the voids are introduced into the preform by, e.g., drilling, deliberately creating bubbles in the glass, or stacking tubes (within, around or constituting the preform) to create the void pattern before the fiber is drawn. The preform is then drawn into a fiber according to conventional practice.

When an optical fiber is immersed in a hydrogen atmosphere (or any other fluid environment), the hydrogen (or other fluid) molecules will quickly diffuse through the silica cladding and attain an equilibrium concentration in the glass (at reasonable operating temperatures). If there are any voids (i.e., GTLs) in the silica glass, then the hydrogen (or other fluid) molecules will diffuse through the silica glass to these pockets and progressively attain the equilibrium concentration therein. Hence, in equilibrium, the concentration of hydrogen in these pockets will be approximately 33 times (depending on the solubility of the gas molecule in the glass) the concentration of hydrogen in the glass. As a result, these pockets will serve as trapping sites for any hydrogen entering the glass and prevent migration of hydrogen toward the core where light is transmitted.

In a preferred embodiment intended for use in hydrogen-rich environments, the ratio of the concentration of $H_2$ molecules in the glass ($C_{glass}$) to that in the gas phase ($C_{gas}$) is approximately 0.03 and is relatively temperature-insensitive and pressure-insensitive (in the relatively low-pressure regime). In the exemplary configuration shown in FIG. 1, an optical fiber is designed with 10% of its cross-section occupied by GTLs, which are evenly distributed throughout the cross-section of the fiber. If $N_{out}$=concentration of hydrogen molecules in the fluid phase (outside the fiber), and $N_{inside}$=concentration of hydrogen molecules in the silica glass (inside the fiber), then, as explained above, $N_{inside}/N_{out}$~0.03.

Figure 4:
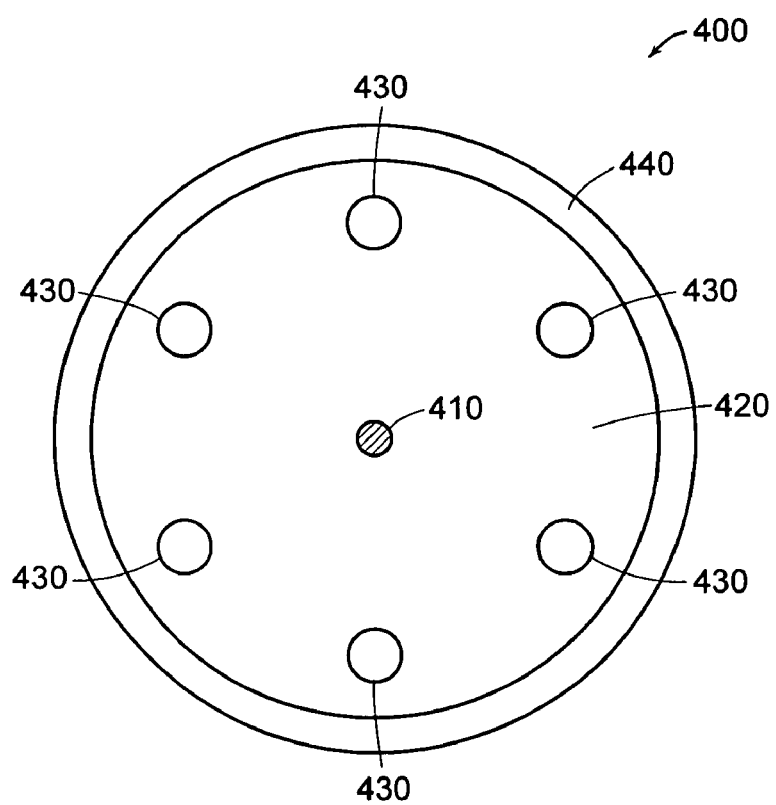
FIG. 4 is a cross-sectional view of an optical fiber that includes a hermetic coating according to another embodiment of the invention.

Consider now the kinetics of hydrogen diffusion through a hermetic (e.g., carbon) barrier on the surface of the optical fiber with holes near the periphery (as shown in FIG. 4). This essentially slows down the kinetics of hydrogen diffusion into the optical fiber. As the hydrogen molecules trickle into the fiber, they rapidly equilibrate within the glass fiber and locally find the GTLs; in these traps the hydrogen molecules quickly attain equilibrium with the silica glass, so the GTLs "absorb" approximately 33 times more hydrogen/unit volume than the silica glass. Therefore in a given period of time, if N hydrogen molecules entered through the hermetic barrier, in a conventional fiber they would disperse randomly throughout its cross-section A with a density N/A. For the GTL fiber of the present invention, by contrast, if the gas lines occupy an area $A_1$ of the cross-section of the fiber and contain $N_1$ ingressing molecules, and the rest of the fiber (silica glass) has a cross-sectional area $A_2$ and contains $N_2$ ingressing molecules, then the following relationships hold:

$$N = N_1 + N_2 \text{ and } A = A_1 + A_2$$

$$N_1/A_1 = K_{g\text{-}s} N_2/A_2$$

where $K_{g\text{-}s}$ is the solubility of the ingressing molecules in the gas phase relative to the silica glass and in the case of hydrogen has a value $K_{g\text{-}s} \sim 33$. Solving this set of equations for $N_2/A_2$:

$$N_2/A_2 = N/(A - A_1 + K_{g\text{-}s}A_1) \equiv N/(\chi A) \quad (3)$$

If $A_1 = 0.10A$, with $K_{g\text{-}s} = 33$, then $$N_2/A_2 = N/(4.2A)$$

This means that, where the GTLs occupy 10% of the fiber cross-section, the concentration of ingressing molecules in the silica glass will be 4.2 times less than N/A (i.e., the equilibrium value in the absence of the GTLs); this occurs simply because the bulk of the ingressing molecules tend to reside in the GTLs. If the cross-sectional area of the GTLs is increased to 20-30%, $$N_2/A_2 = N/(7.4A) \text{ for } A_1 = 0.20A, \text{ i.e. } \sim 7.4 \text{ fold decrease in } H_2 \text{ concentration in glass}$$

$$= N/(10.6A) \text{ for } A_1 = 0.30A, \text{ i.e. } \sim 10.6 \text{ fold decrease in } H_2 \text{ concentration in glass}$$

Even if the cross-sectional area occupied by the GTLs is only 3%, a two-fold decrease in $H_2$ concentration is observed:

$$N_2/A_2 \sim N/(1.96A) \text{ for } A_1 = 0.03$$

In each of the cases above, the concentration of $H_2$ molecules in the glass has decreased by some factor $\chi$; since the attenuation of light in the fiber (equation 2), e.g., at 1.24 µm, is directly proportional to the concentration of $H_2$ molecules in the glass, the cases above will give rise to a new effective $\tau_{eff}$ given by $\tau_{eff} = \tau_{fx}$. $\tau_{eff}$ is therefore the new time constant describing the effect of ingressing molecules on the optical fiber in the presence of a hermetic coating as well as the GTLs.

Figure 2:
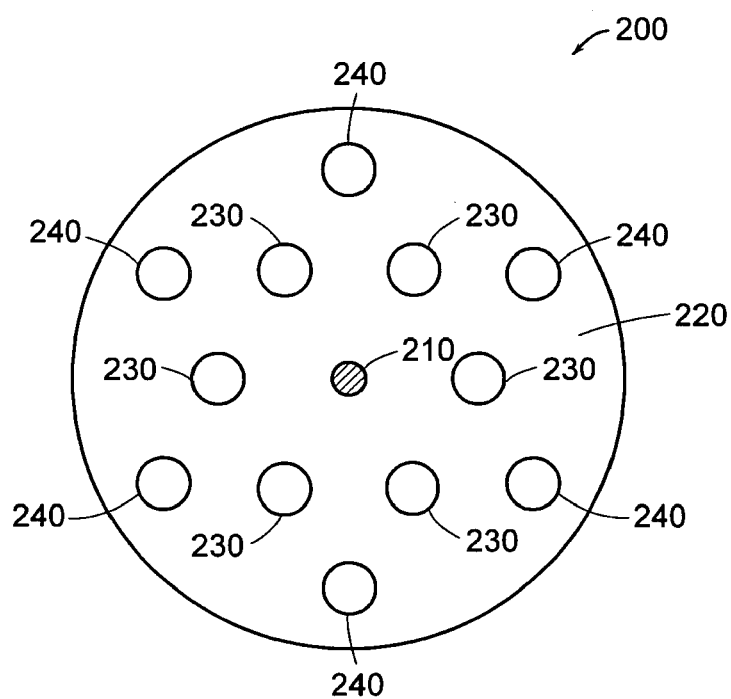
FIG. 2 is a cross-sectional view of an optical fiber according to another embodiment of the invention.

Another aspect of the invention relates to the distribution of GTLs in the cross-section of the fiber. This geometric pattern may be important in determining the kinetics of molecular diffusion into the core of the fiber; different patterns and arrangements may optimize the kinetics. An example of one arrangement is shown in FIG. 2. The inner concentric series of GTLs 230 in the cladding 220 (closer to the core 210 of the fiber 200) provides a barrier to ingressing molecules not trapped within the outer series of GTLs 240. The precise placement of the GTLs may also affect the strength of the fiber. It is desirable to distance the GTLs reasonably far from the core so as to not affect the optical properties of the fiber; this distance, however, will be determined both by the details of the fiber design and by the specifics of the application under consideration. In some cases (e.g., for multi-mode fiber) it may be desirable to place the GTLs in very close proximity to the core; in this case some light leakage (and therefore signal loss) may be considered acceptable in order to minimize molecular ingress to the core of the fiber. In other cases it may be desirable to place the GTLs at significant distance away from the core to minimize any light leakage due to the presence of the voids (for example, in typical telecommunication single-mode fibers).

Figure 3:
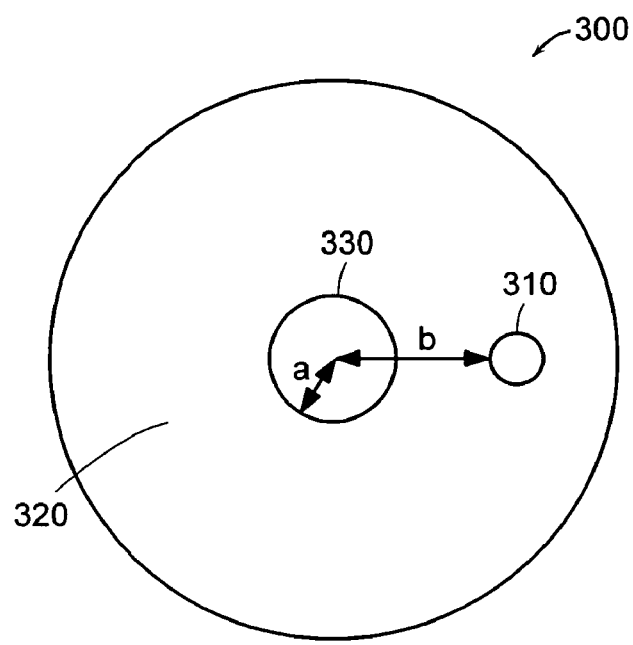
FIG. 3 is a cross-sectional view of an optical fiber that illustrates the relative positions of a core and a void according to an embodiment of the invention.

In some applications, including those which use single-mode fibers, it may be desirable to place the GTLs in close proximity to the core such that the benefit obtained by shielding of the core from direct molecular ingress outweighs the leakage and bending losses that result from proximal location of the GTLs to the core. Referring to FIG. 3, a single- or multi-mode fiber 300 has a radius "a" and at least one GTL 310 positioned within the cladding 320 such that the distance "b" from the edge of the GTL 310 and the center of the core 330 is described by b/a>1.

It is clear from above that the GTLs may be placed at various (and varied) locations relative to the core of the fiber; in general, the optimal GTL-to-core distance depends on the power distribution in the core and cladding. A particularly preferred embodiment, applicable to both single-mode and multi-mode fiber, places the GTLs at a distance from the center of the fiber where the power of transmitted light has dropped to a level no greater than its maximum value multiplied by $1/e^2$. This distance is straightforwardly ascertained by those skilled in the art without undue experimentation.

Referring to FIG. 4, if desired, a fiber 400 (which includes a core 410, a cladding 420, and one or more voids 430 as described herein) may be provided with a nominally hermetic coating 440 such as ceramic material, metal, or a carbon-based composition on the surface of the cladding 420 in order to provide an additional barrier inhibiting initial penetration of ingressing molecules into the fiber.

In another aspect of the invention, the ingressing molecule reacts with one or more gases in the GTLs. By introducing one or more highly reactive gases into the GTLs, it is possible to reliably initiate a reaction between the gas (e.g., $Cl_2$) and the ingressing molecule (e.g., $H_2$). This reaction preferably leads to the formation of one or more molecules larger than the ingressing species, and which therefore have a significantly reduced diffusivity and solubility in the glass relative thereto. The resulting reaction product is effectively excluded from the gas diffusion process in glass, and therefore cannot degrade the optical performance of the fiber. Care should be taken in choosing a gas species to ensure that a reaction will take place with the ingressing molecule at the temperatures of interest; in the case of ingressing $H_2$, this should be readily achievable with most halogenic gases. Examples of reactions that may take place inside the GTLs include:

$$O_2 + 2H_2 \rightarrow 2H_2O$$

$$N_2 + 3H_2 \rightarrow 2NH_3$$

$$Cl_2 + H_2 \rightarrow 2HCl \text{ (similarly, } Br_2 \text{ and } I_2 \text{ produce 2HBr and 2HI, respectively)}$$

If the concentration of reactive gases in the GTL is sufficiently high, then as the temperature increases (and as an increasingly greater number of molecules diffuse into the glass), the rate at which ingressing molecules react with the reactive gases (and are sequestered and thereby prevented from entering back into the glass) also increases. In some situations, therefore, the number of hydrogen molecules present in the glass does not increase with increasing temperature; or, at least, the rate of increase is significantly reduced in comparison to the case where no gas-phase reactions take place in the GTLs.

The reactive gas can be introduced into the GTLs in a variety of ways. For example, the gas can be added during the preform deposition process. For example, layers of under-sintered glass, preferably including volatile elements (e.g., boron or phosphorous), can be deposited prior to the regular core and cladding deposition. Small voids in the under-sintered glass will grow at high temperature during preform collapse, forming the desired gas-filled GTLs. Alternatively, glass powders (e.g., soot) can be applied on the outer surface of the preform, which will outgas and form bubbles during the jacketing process. Another method involves placing a jacket containing hydroxyl groups over a substrate that has a high chlorine content. Reaction between the hydroxyl groups and the chlorine form gaseous HCL bubbles during the jacketing process.

In other methods according to the invention, one or more reactive gasses are added to the preform prior to or during the fiber draw process. For example, the reactive gasses may be added to one end of a preform while the other end of the preform is being drawn into a fiber. After the fiber draw is complete, the reactive gases remain in the GTLs within the cladding.

Alternatively, the reactive gases may be introduced in a post-draw step. For example, in fiber embodiments that include continuous, longitudinal GTLs, the reactive gas may be fed through one end of the fiber. Once the gas has been added, the ends of the fiber are then sealed (e.g., by fusing or arcing), encasing the reactive gas within the GTLs. Alternatively, one end of the fiber may be closed prior to feeding the gas through the remaining open end of the fiber. After adding the reactive gas, the open end of the fiber is closed, trapping the reactive gas within the GTLs. By separating the gas incorporation process completely from the draw process, the GTLs may be filled with reactive gases at fairly high pressures completely independent of fiber draw process parameters. Another advantage of this method is that a higher volume of gas can be injected into the GTLs (using high pressure), resulting in more reactive molecules available to bond with more hydrogen molecules and prevent diffusion of hydrogen to the fiber core, thus extending the fiber's useful lifetime.

The following example is meant to illustrate, not limit, the scope of the present invention.

Example 1

In order to determine how optical fibers according to the invention perform under harsh environments, a single-mode test fiber was constructed containing 3 GTLs in its cladding. The test fiber core had a diameter of approximately 8 μm, and the diameter of the core plus the cladding was 125 μm. The GTLs were approximately equal in size and were randomly positioned within the cladding. The total cross-sectional area of the three GTLs was approximately 5-10% of the cross-sectional area of the core plus the cladding. The test fiber also included a hermetic carbon layer over the cladding and an outer polymeric coating for mechanical protection. A control fiber was also constructed using the same materials and having the same dimensions, but lacking GTLs.

An attenuation spectrum of a coiled 500 m length of the test fiber was recorded at ambient temperature and pressure using a PK2500 optical bench (Photon Kinetics, Beaverton, Oreg.). The test fiber coil was then placed in a chamber and heated to 185° C. under 1600 psi of hydrogen for 68 hours, at which point the test fiber was removed from the chamber and another attenuation spectrum was generated using the same PK2500 optical bench. The same procedure was repeated using the same length of the control fiber. The results of the experiments are summarized in the graph appearing in FIG. 5.

Figure 5:
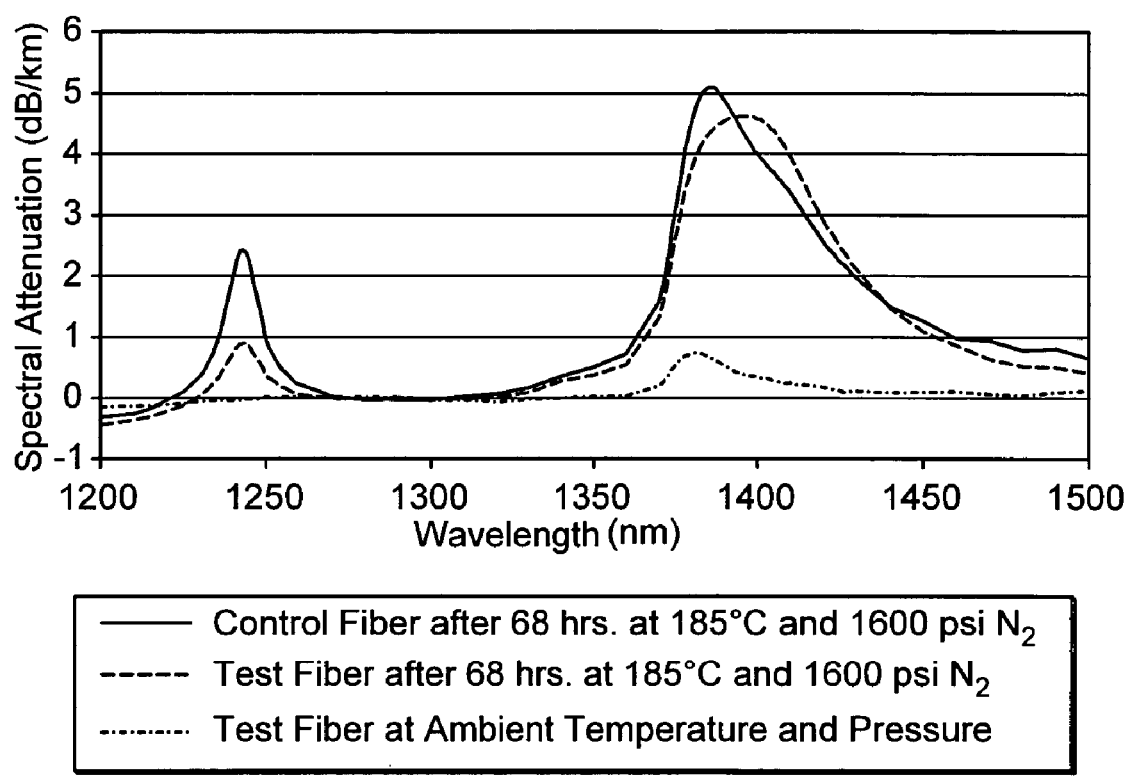
FIG. 5 is a graphical representation of the spectral attenuation of an optical fiber containing voids according to the invention and an optical fiber that does not contain voids.

Referring to FIG. 5, it is well-known that the absorption peak at ~1240 nm is characteristic of molecular hydrogen in silica glass, and the height of the peak correlates to the amount of hydrogen in the glass. The 1240 nm peak also includes a small contribution from hydroxyl group absorption, (equal to approximately 1/15 of the hydroxyl absorption peak at ~1390 nm) which can be subtracted from the 1240 nm peak. After performing the appropriate corrections on the absorption data, the height of the 1240 nm peak for the test fiber was ~0.6 dB/km, while the height of the 1240 nm peak for control fiber was ~2.2 dB/km. Thus, the test fiber suffered approximately 3.6 (e.g., 2.2/0.6) less attenuation due to hydrogen ingression than the control fiber, which implies that there was approximately 3.6 times less hydrogen in the core of the test fiber than in the control fiber. It should be noted that this experiment was performed on a fiber with a low GTL count (i.e., only 5-10% of the total area of the fiber cross-section). It is expected that the resistance to hydrogen ingression in the fiber core would increase significantly when more voids are disposed in the cladding.

The invention may be embodied in other specific forms without departing form the spirit or essential characteristics thereof. The foregoing embodiments are therefore to be considered in all respects illustrative rather than limiting on the invention described herein. Scope of the invention is thus indicated by the appended claims rather than by the foregoing description, and all changes that come within the meaning and range of equivalency of the claims are intended to be embraced therein.

What is claimed is:

1. An optical fiber with improved resistance to ingressing molecules, the fiber comprising:
    a. a core for guiding at least a significant portion of incoming light; and
    b. a cladding surrounding the core, the cladding containing one or more voids spaced apart from the core so as not to interfere with light travelling therein, the voids acting as trapping sites for ingressing molecules.

2. The optical fiber of claim 1, wherein the voids extend longitudinally through the fiber.

3. The optical fiber of claim 1, wherein the ingressing molecule is hydrogen.

4. The optical fiber of claim 1, further comprising a hermetic coating on an outer surface of the optical fiber.

5. The optical fiber of claim 4, wherein the coating comprises at least one of a ceramic material, a metal and a carbon-based composition.

6. The optical fiber of claim 1, wherein the closest distance between the voids and the center of the core divided by the radius of the core is greater than 1.

7. The optical fiber of claim 1, wherein at the closest distance between the voids and the center of the fiber, the power of transmitted light is no greater than its maximum value multiplied by $1/e^2$.

8. The optical fiber of claim 1, where the voids form a pattern of concentric rings to create a multidirectional barrier to the diffusion of ingressing molecules toward the core.

9. The optical fiber of claim 1, wherein at least some of the voids are filled with at least one gas capable of reacting with the ingressing molecules.

10. The optical fiber of claim 9, wherein the gas comprises a halogen gas.

11. The optical fiber of claim 9, wherein the gas comprises oxygen.

12. The optical fiber of claim 9, wherein the gas comprises nitrogen.

* * * * *